(12) United States Patent
Lee

(10) Patent No.: US 11,179,000 B2
(45) Date of Patent: Nov. 23, 2021

(54) COOKING APPARATUS WITH ROTATING CONTAINER

(71) Applicant: Whealthy Franchise Inc., Irvine, CA (US)

(72) Inventor: Hyung Jick Lee, Gyeonggi-do (KR)

(73) Assignee: WHEALTHY FRANCHISE INC., Irvine, CA (US)

( * ) Notice: Subject to any disclaimer, the term of this patent is extended or adjusted under 35 U.S.C. 154(b) by 456 days.

(21) Appl. No.: 16/155,947

(22) Filed: Oct. 10, 2018

(65) Prior Publication Data

US 2020/0113376 A1 Apr. 16, 2020

(51) Int. Cl.
  *A47J 36/16* (2006.01)
  *A47J 36/32* (2006.01)
  *A47J 37/04* (2006.01)
  *A47J 27/00* (2006.01)

(52) U.S. Cl.
  CPC ........... *A47J 36/165* (2013.01); *A47J 27/004* (2013.01); *A47J 36/32* (2013.01); *A47J 37/047* (2013.01)

(58) Field of Classification Search
  CPC .................................................... A47J 37/047
  See application file for complete search history.

(56) References Cited

U.S. PATENT DOCUMENTS

| | | | | |
|---|---|---|---|---|
| 4,450,758 A | * | 5/1984 | Belinkoff | A47J 37/047 99/332 |
| RE31,833 E | * | 2/1985 | Loeffler | A47J 37/047 219/433 |
| 5,182,981 A | * | 2/1993 | Wilcox | A23N 12/10 219/389 |
| 5,259,300 A | * | 11/1993 | Yajima | A47J 37/047 366/225 |
| 5,398,597 A | * | 3/1995 | Jones | A47J 37/1266 219/492 |
| 6,114,666 A | * | 9/2000 | Best | A47J 37/0713 126/39 BA |
| 2011/0005398 A1 | * | 1/2011 | Garcia | A47J 31/057 99/280 |
| 2019/0170365 A1 | * | 6/2019 | Choi | F24C 3/128 |

FOREIGN PATENT DOCUMENTS

| | | | | |
|---|---|---|---|---|
| CA | 2095320 A1 | * | 10/1994 | ............ A47J 37/047 |
| CH | 451443 A | * | 5/1968 | ............. A47J 27/14 |
| JP | 07204101 A | * | 8/1995 | |
| JP | 2007014563 A | * | 1/2007 | |
| JP | 2010104763 A | * | 5/2010 | |
| JP | 2013042880 A | * | 3/2013 | |
| JP | 2017185170 A | * | 10/2017 | |

* cited by examiner

*Primary Examiner* — John J Norton

(74) *Attorney, Agent, or Firm* — Bacon & Thomas, PLLC

(57) ABSTRACT

A cooking apparatus includes a cooking container, a heater, a driving unit, and a heat insulating member. The cooking container is configured to store food. The heater is configured to heat the cooking container. The driving unit includes a power generator configured to generate power for rotating the cooking container and a driving shaft extending in one direction and rotated by the power generator. The heat insulating member is provided between the cooking container and the power generator to prevent heat generated by the heater from being transferred to the power generator.

14 Claims, 15 Drawing Sheets

COOKING APPARATUS WITH ROTATING CONTAINER

FIELD OF THE INVENTION

The present disclosure relates to a cooking apparatus.

BACKGROUND OF THE INVENTION

Most of conventional cooking apparatuses are stir-fryers for cooking grains with weak heating power. Such cooking apparatuses are used only for stir-frying grains and thus have weak heating power. However, strong heating power is required to cook delicious food quickly.

However, when the heating power of the heater of the conventional cooking apparatus is increased, the heat of the heater is transmitted to a driving unit such as a motor or the like and, thus, the driving unit is required to be driven only for a short time. Further, the conventional cooking apparatus is disadvantageous in that it is difficult to stir noodles in a cooking container and food is likely to be excessively cooked due to user's carelessness.

SUMMARY OF THE INVENTION

In view of the above, the present disclosure provides a cooking apparatus capable of cooking with strong heating power for a long period of time.

The present disclosure also provides a cooking apparatus capable of considerably reducing the possibility of burning food due to user's carelessness.

The present disclosure also provided a cooking apparatus capable of efficiently stirring noodles in a cooking container.

In accordance with an aspect, there is provided a cooking apparatus including: a cooking container configured to store food; a heater configured to heat the cooking container; a driving unit including a power generator configured to generate power for rotating the cooking container and a driving shaft extending in one direction and rotated by the power generator; and a heat insulating member provided between the cooking container and the power generator and configured to prevent heat generated by the heater from being transferred to the power generator.

The cooking apparatus may further include a stirring member configured to stir noodles in the cooking container, wherein the stirring member includes: a base portion; a plurality of extended portions spaced apart from each other and extending from the base portion toward the center of the cooking container to catch noodles in the cooking container; and a plurality of bent portions extending from the respective extended portions while being bent with respect to the extended portions.

The plurality of extended portions may include a first extended portion; a second extended portion; and a third extended portion extending further away from an opening of the cooking container as it goes away from the base portion, wherein the second extended portion is provided between the first extended portion and the third extended portion, and the first extended portion is closer to the second extended portion than to the opening of the cooking container.

The cooking apparatus may further include a main body; and a supporting unit supported by the main body, wherein the supporting unit includes a first supporting member supported by the main body to be reciprocable in a direction in which the cooking container becomes away from and closer to the heater; and a second supporting member supported rotatably with respect to the first supporting member and configured to support the driving unit.

The center of rotation of the second supporting member with respect to the first supporting member may be located at a lower rear end of the second supporting member.

The driving unit may further include a connecting part connected to the driving shaft, wherein the connecting part includes a connecting body; and an engaging protrusion extending from an outer surface of the connecting body in a direction deviated from said one direction, wherein one or more recesses are formed on an outer peripheral surface of the the connecting body, the one or more recesses extending along a circumferential direction of the outer peripheral surface.

The connecting part may further include an insert to be fixed to the driving shaft, a body insert hole, for allowing the insert to be inserted therethrough to the driving shaft, may be formed at the connecting body, and the body insert hole may be formed at the recess.

The connecting part may further include a shaft heat insulator inserted into the connecting body and surrounding the driving shaft to prevent heat from being transferred to the driving shaft.

The cooking container may include a container main body providing a space for storing food; and a connector that is coupled to the container main body and selectively engaged with the connecting part and that provides an engaging hole into which the engaging protrusion is inserted, wherein the engaging hole includes a guide portion extending in said one direction; and a latching portion extending from one end portion of the guide portion in one of a clockwise direction and a counterclockwise direction with respect to an axial direction of the driving shaft.

A width of the guide portion is greater than a width of the latching portion by 2 to 2.5 times.

The power generator may be configured to rotate the cooking container only in said one of the clockwise direction and the counterclockwise direction about the driving shaft and prevent the driving shaft from rotating in the other one of the clockwise direction and the counterclockwise direction when there is no power.

The cooking apparatus may further include a heat shield supported by the second supporting member and configured to prevent heat generated by the heater from being transmitted to the power generator, wherein the heat shield extends upward toward the cooking container at a position below the driving shaft.

The supporting unit may further include a driving unit cover surrounding the driving unit and provided with a heat radiation hole.

The cooking apparatus may further include a notification device configured to generate a signal to be recognized by a user; a timer configured to count and display a predetermined period of time; and a control unit configured to receive a signal of an operation of the heater, control operations of the notification device and the timer, and receive inputs of first time and second time, wherein the control unit is configured to control the notification device to generate a notification signal when time reaches the first time after the heater is operated and to stop the notification signal when time reaches the second time and also configured to control the timer to start to count time when time reaches the second time.

The heat insulating member may include a plate made of ceramic.

In accordance with the embodiments of the present disclosure, the cooking apparatus can cook with strong heating power for a long period of time.

Further, a user can easily recognize preheating time and cooking time.

Moreover, noodles in the cooking container can be efficiently stirred.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Figure 1:
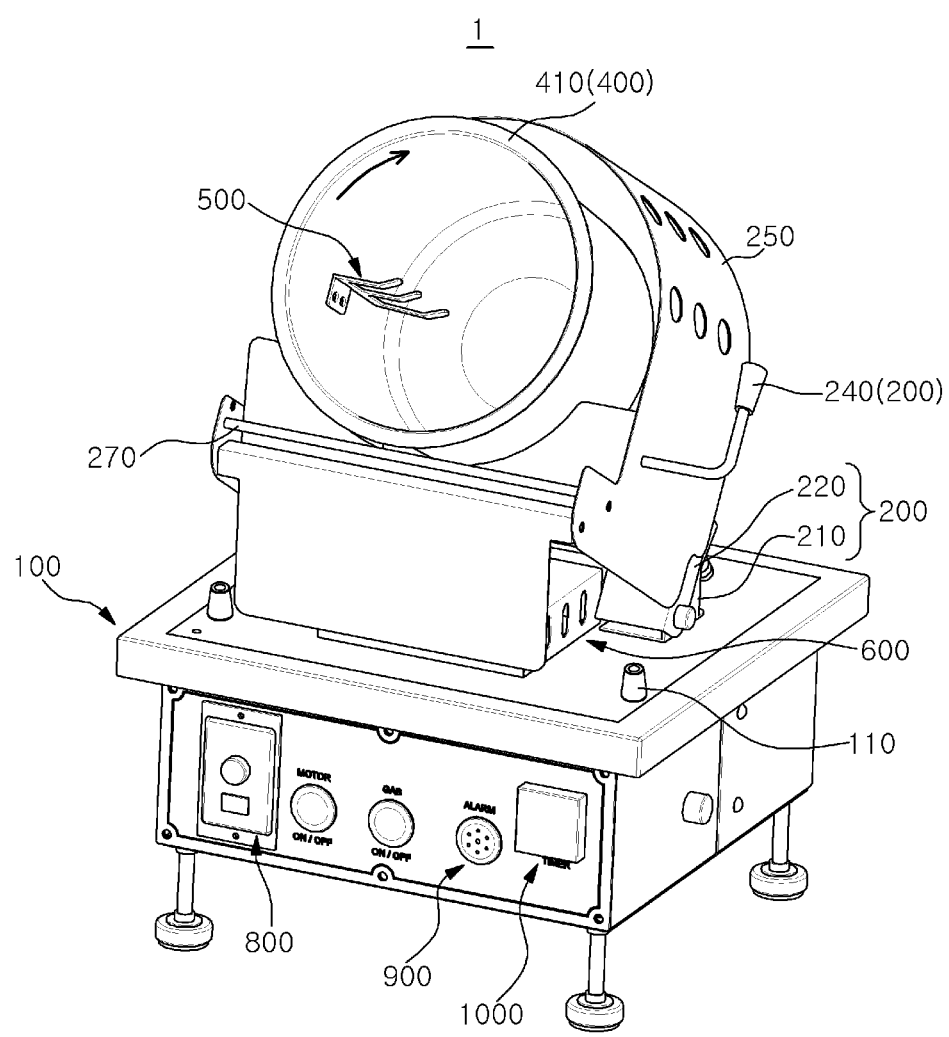
FIG. 1 is a front perspective view of a cooking apparatus according to an embodiment.
Figure 2:
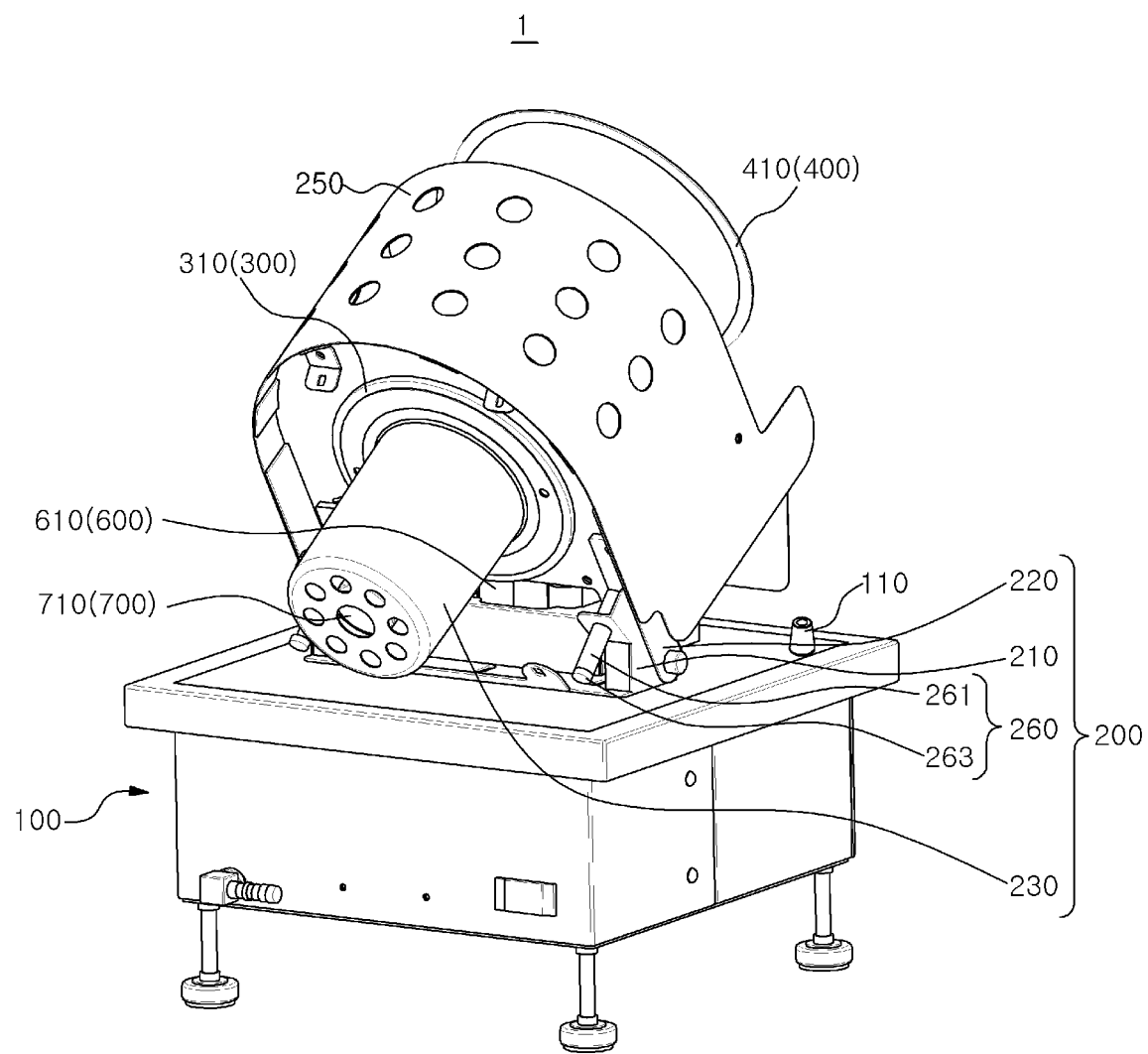
FIG. 2 is a rear perspective view of the cooking apparatus shown in FIG. 1.
Figure 3:
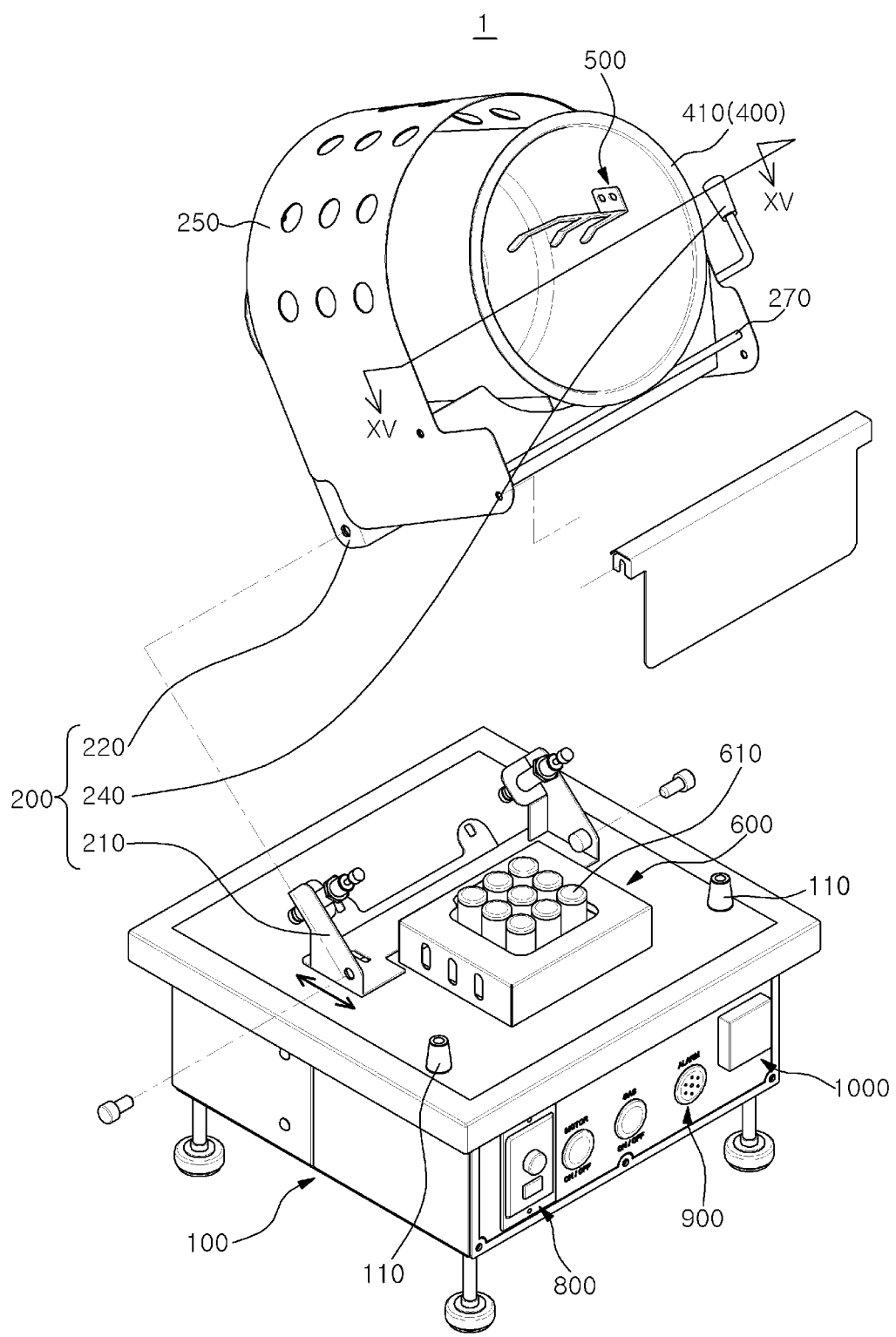
FIG. 3 is an exploded perspective view of the cooking apparatus shown in FIG. 1.

Hereinafter, specific embodiments for implementing the technical ideal of the present disclosure will be described in detail with reference to the accompanying drawings.

However, in describing the disclosure, detailed descriptions of known configurations or functions that make the disclosure obscure may be omitted.

When it is said that a component is "connected", "supplied" or "transmitted" to another component, it should be understood that the former component may be directly connected, supplied, or transmitted to the latter component or a third component may be interposed between the two components.

Specific terms used in the present specification are used simply to describe specific embodiments without limiting the disclosure. An expression used in the singular encompasses the expression of the plural, unless it has a clearly different meaning in the context.

Further, in the present specification, the terms such as "upper," "lower," "side" and the like refer to directions in the drawings to which reference is made. Such terms can be differently expressed when a direction of a target is changed.

For the same reason, some components in the drawings are exaggerated, omitted or schematically illustrated, and the size of each component does not exactly reflect its actual size.

The terms used herein, including ordinal numbers such as "first" and "second," may be used to describe, and not to limit, various components. The terms simply distinguish the components from one another.

In the present specification, the term "including" specifies the presence of specific features, regions, integers, steps, operations, elements, and/or components, but does not preclude the presence or addition of other features, regions, integers, steps, operations, elements, and/or components.

Hereinafter, a specific configuration of a cooking apparatus 1 according to an embodiment will be described with reference to the drawings.

As shown in FIGS. 1 to 5, the cooking apparatus 1 according to an embodiment may include a main body 100, a supporting unit 200, a heat insulating unit 300, a cooking container 400, a stirring member 500, a heater 600, a driving unit 700, a control unit 800, a notification device 900, and a timer 1000.

The supporting unit 200 can support the heat insulating unit 300, the cooking container 400, and the driving unit 700. The supporting unit 200 may include a first supporting member 210, a second supporting member 220, a driving unit cover 230, a handle 240, the container cover 250, a stopper 260, and a locking part 270.

The main body 100 includes a frame for supporting the supporting unit 200, the heater 600 and the control unit 800. The main body 100 can support the supporting unit 200 at an upper portion thereof and can accommodate therein the heater 600. The main body 100 may be provided with supporting members 110 for supporting the supporting unit 200.

When the second supporting member 220 is rotated to move the opening of the cooking container 400 downward, the supporting members 110 can support the supporting body 200 to prevent further rotation of the cooking container 400. The supporting members 110 can support the supporting unit 200 in a state where the front side of the cooking container 400 and the supporting unit 200 are inclined slightly upward, when viewing the cooking container 400 rotated such that the opening thereof is moved downward, the supporting members 110 can support a lower front portion of a container cover 250 of the supporting unit 200.

Figure 6:
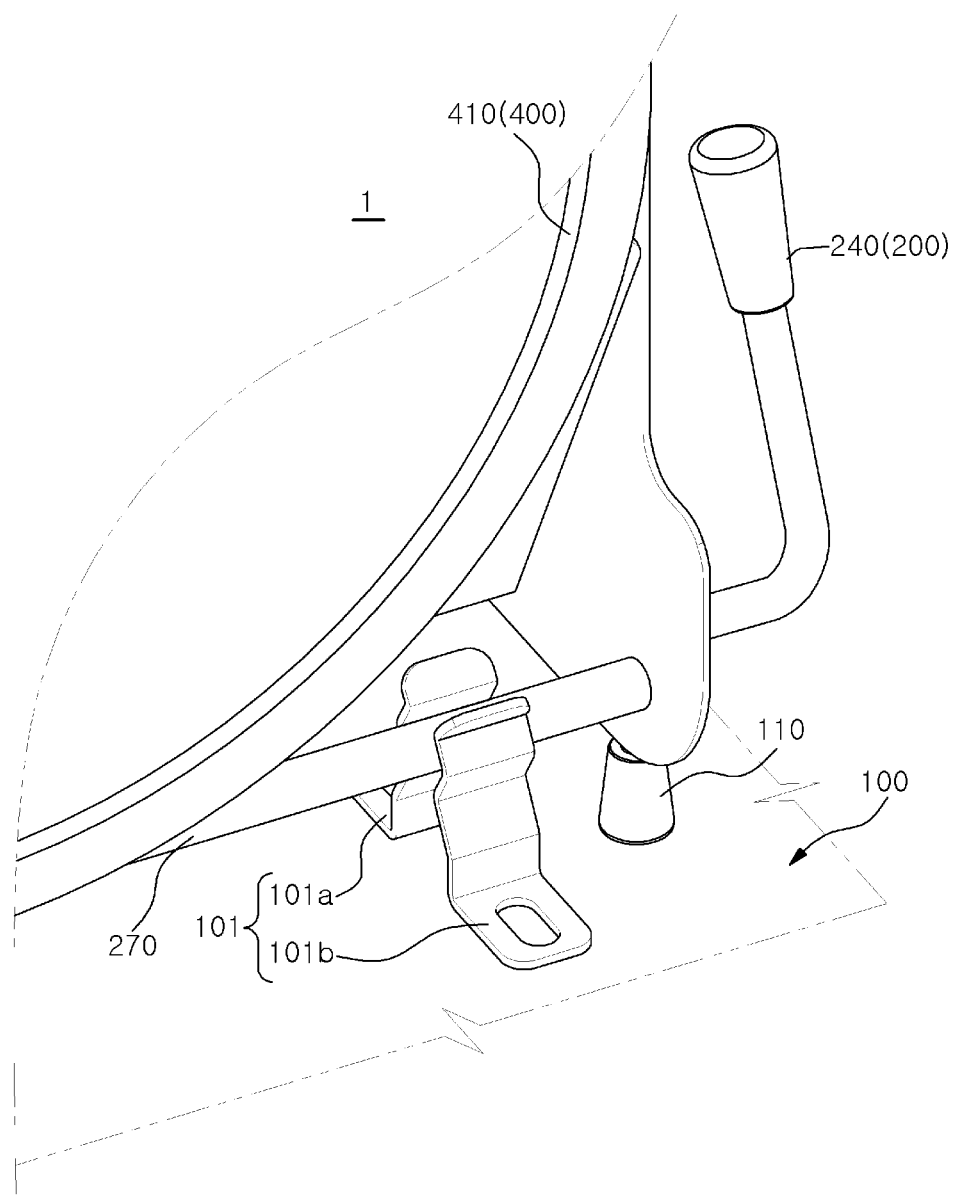
FIG. 6 is an enlarged view showing a state in which a locking part of the supporting unit shown in FIG. 1 is engaged with the latch.

Referring to FIG. 6, the main body 100 may be provided with a latch 101, if necessary. The latch 101 may elastically fix the supporting unit 200. The latch 101 may include a first latch piece 101a and a second latch piece 101b for fixing the supporting unit 200. The supporting unit 200 can be fixed to the main body 100 by fitting the locking part 270 between the first latch piece 101a and the second latch piece 101b. The first latch piece 101b and the second latch piece 101b may elastically hold the locking part 270. Further, the first latch piece 101a and the second latch piece 101b can be fixed on the main body 100 such that the distance therebetween can be adjusted. The latch 101 may include a ring, a clamp, or the like. The latch 101 of the present embodiment may be omitted depending on an operating environment.

The first supporting member 210 is movable with respect to the main body 100. The first supporting member 210 may be provided on the rear side of the heater 600 and can reciprocate on the main body 100 in a direction in which the driving unit 700 becomes away from and closer to the heater 600. For example, the first supporting member 210 can slide on the main body 100 in a frontward/backward direction (an arrow direction in FIG. 3). When the heating time is excessively long or the heating power of the heater 600 is strong, a user can prevent the driving unit 700 from being excessively heated by moving the first supporting member 210 to the rear side. When the driving unit 700 is cooled, more heat can be applied to the cooking container 400 by moving the first supporting member 210 to the front side. Further, the first supporting member 210 can rotatably support the second supporting member 220.

The second supporting member 220 can support the heat insulating unit 300, the cooking container 400, and the driving unit 700. The cooking container 400 may be provided in front of the second supporting member 220. The rear side of the second supporting member 220 can support a power generator 710 of the driving unit 700. A hole through which a driving shaft 720 of the driving unit 700 penetrates may be formed at the second supporting member 220. Further, the second supporting member 220 may be rotatably connected to the first supporting member 210 by a pin or the like. The center of rotation of the second supporting member 220 may be located at the lower rear end portion. The upper portion of the second supporting member 22 can rotate in the frontward or backward direction with respect to the first supporting member 210 about the hinge provided at the lower rear end portion. The second supporting member 220 can rotate with respect to the first supporting member 210 about a rotation axis extending in the left-right direction. The cooking container 400 can be rotated by the rotation of the second supporting member 220 such that the opening of the cooking container 400 is moved downward or upward. The inclination of the cooking container 400 with respect to the ground can be adjusted by the rotation of the second supporting members 220. When the upper portion of the second supporting member 220 is rotated to move frontward, the cooking container 400 becomes substantially horizontal with the ground or slightly inclined with respect to the ground. The second supporting member 220 can be stably maintained in a state where the second supporting member 220 is rotated to move the opening of the cooking container 400 downward or in a state where the second supporting member 220 is rotated to move the opening of the cooking container 400 upward.

The driving unit cover 230 covers the driving unit 700 while being separated from the housing of the driving unit 700 and can prevent the driving unit 700 from being excessively heated by the heater 600. In other words, the driving unit 700 can be accommodated in the driving unit cover 230. The driving unit cover 230 may be provided on the rear side of the second supporting member 220, and the front end portion of the driving unit cover 230 may be connected to the heat insulating member 310. The driving unit cover 230 may include a side surface and a rear surface that cover the driving unit 700, and a heat discharge hole is formed on the rear surface.

The handle 240 can be connected to the second supporting member 220. The user can rotate the second supporting member 220 by gripping and moving the handle 240 up and down. Further, the handle 240 can extend upward without protruding beyond the container cover 250 when viewed from the side to avoid the heat from the heater 600. Accordingly, even when the heater 600 operates, the user can rotate the second supporting member 220 by gripping the handle 240.

The container cover 250 can be supported by the second supporting member 220. The container cover 250 can cover the rear portion and the central portion of the cooking container 400 when viewed from the side. When viewing the cooking container 400 from the side, the container cover 250 can cover a portion of the cooking container 400 from the rear end of the cooking container 400 to a position at ½ or ¾ of the length of the cooking container 400. In other words, the portion of the cooking container 400 from the opening (front end) of the cooking container 400 to a position at ¼ or ½ of the length of the cooking container 400 when viewed from the side may not be covered by the container cover 250. Further, the container cover 250 can surround the circumferential portion of the cooking container 400 while being separated from the circumferential portion of the cooling container 400 by a predetermined distance. The user can fasten the connector 420 of the cooking container 400 to the connecting part 730 of the driving unit 700 while visually checking the opening side (front side) of the cooking container 400 which is not covered by the container cover 250 through a gap formed between the cooking container 400 and the container cover 250.

Figure 5:
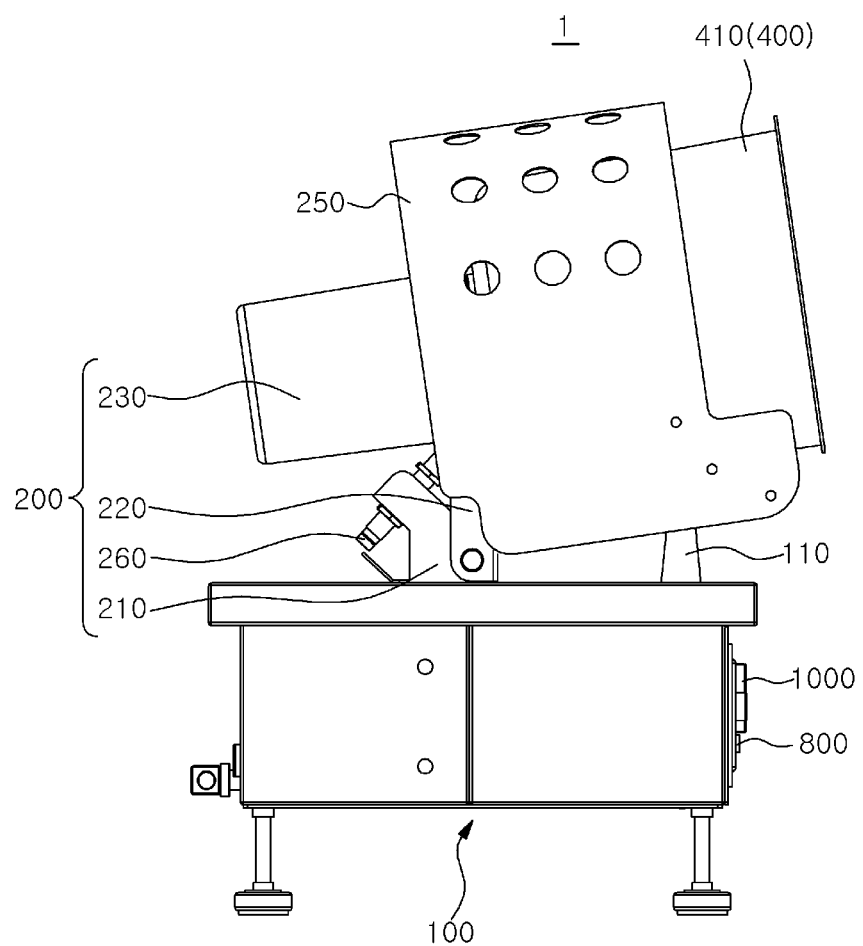
FIG. 5 is a right side view showing a state in which a supporting unit of the cooking apparatus shown in FIG. 1 is engaged with a latch.

As shown in FIG. 5, when the second supporting member 220 is rotated to move the opening of the cooking container 400 downward, the container cover 250 of the supporting unit 200 can be supported by the supporting members 110 such that the opening of the cooking container 400 is directed to a slightly upward direction. Accordingly, the user can easily take out cooked food from the cooking container 400 without concern for spilling the cooked food.

The stopper 260 can prevent excessive rotation of the second supporting member 220 due to the load of the cooking container 400. In other words, the rotation of the second supporting member 220 can be restricted by the stopper 260, and the excessive separation of the cooking container 400 from the heater 600 can be prevented. The stopper 260 may be a bar-shaped shock absorber projecting and extending from the second supporting member 220 toward the main body 100.

Figure 7:
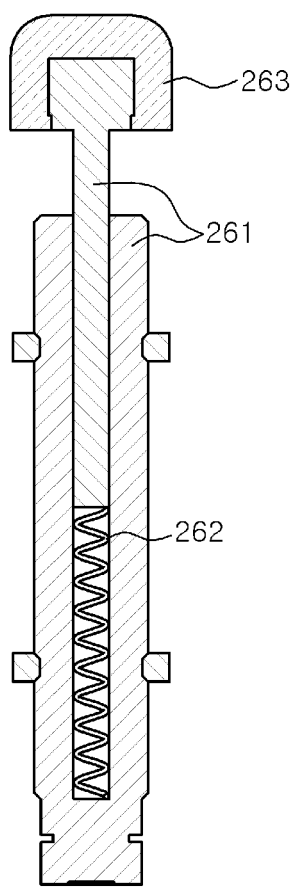
FIG. 7 is a vertical cross sectional view of a stopper of the cooking apparatus shown in FIG. 1.

Referring to FIG. 7, the stopper 260 may include a stopper main body 261, a stopper spring 262 and a buffer member 263 provided at the end of the stopper main body 261. The stopper main body 261 can extend in a sliding manner. The stopper main body 261 may be, e.g., a piston. The stopper spring 262 is disposed in the stopper main body 261 and provides elastic force in a direction in which the stopper body 261 extends. The buffer member 263 may be provided at the end portion of the stopper main body 261. The buffer member 263 can absorb impact applied from the end portion of the stopper main body 261 to the main body 100. The buffer member 263 may be made of, e.g., Teflon (trademark). Further, the stopper 260 has a thread, and the projecting length thereof from the second supporting member 220 can be adjusted. Accordingly, the user can adjust the rotation range of the second supporting member 220 by adjusting the projecting length of the stopper 260. Further, the user can fix the supporting unit 200 to the latch 101 and take out food from the cooking container 400. Then, the user releases the second supporting member 220 from the latch 101 and rotates the second supporting member 220 to the rear side. The second supporting member 220 rotates until the stopper 260 comes in contact with the main body 100. In order to reduce the impact between the stopper 260 and the main body 100, a buffer member such as urethane or the like may be provided at the contact portion between the stopper 260 and the main body 100. Although the stopper 260 is connected to the second supporting member 220 in the present embodiment, the stopper 260 may be connected to the main body 100.

The heat insulating unit 300 can prevent the transfer of heat from the heater 600 to other components. The heat insulating unit 300 may include a heat insulating member 310 and a heat shield 320 for preventing the heat generated by the heater 600 from being transferred to the driving unit 700.

Figure 8:
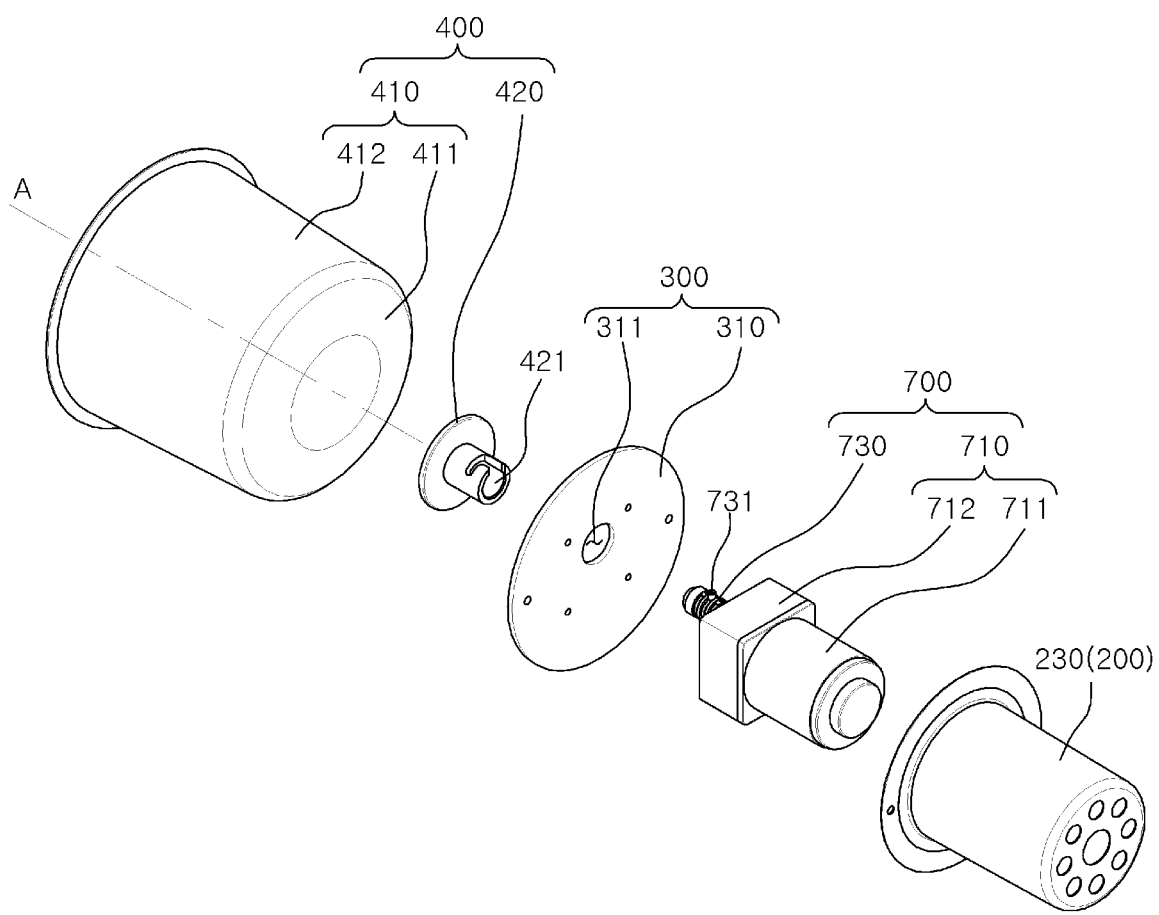
FIG. 8 is an exploded perspective view of a cooking container and a driving unit of the cooking apparatus shown in FIG. 1.

The heat insulating member 310 can block radiant heat of the cooking container 400 and heat transfer from the cooking container 400 to the driving shaft 720. The heat insulating member 310 may be provided on the outer surface of a bottom portion 411 of the cooking container 400 or at the second supporting member 220. The heat insulating member 310 may be provided to surround the driving shaft 720 of the driving unit 700, or may be provided between the second supporting member 220 and the power generator 710. Further, the heat insulating member 310 may extend in a direction deviated from the extension direction of the driving shaft 720. For example, the heat insulating member 310 can be disposed perpendicular to the driving shaft 720. As shown in FIG. 8, a through-hole 311 through which the driving shaft 720 penetrates may be formed at the heat insulating member 310. The through-hole 311 is located at an upper side than the center of the heat insulating member 310. In other words, in the heat insulating member 310, the area of the the lower side portion than the through-hole 311 is greater than the area of the upper side portion than the through-hole 311.

Figure 4:
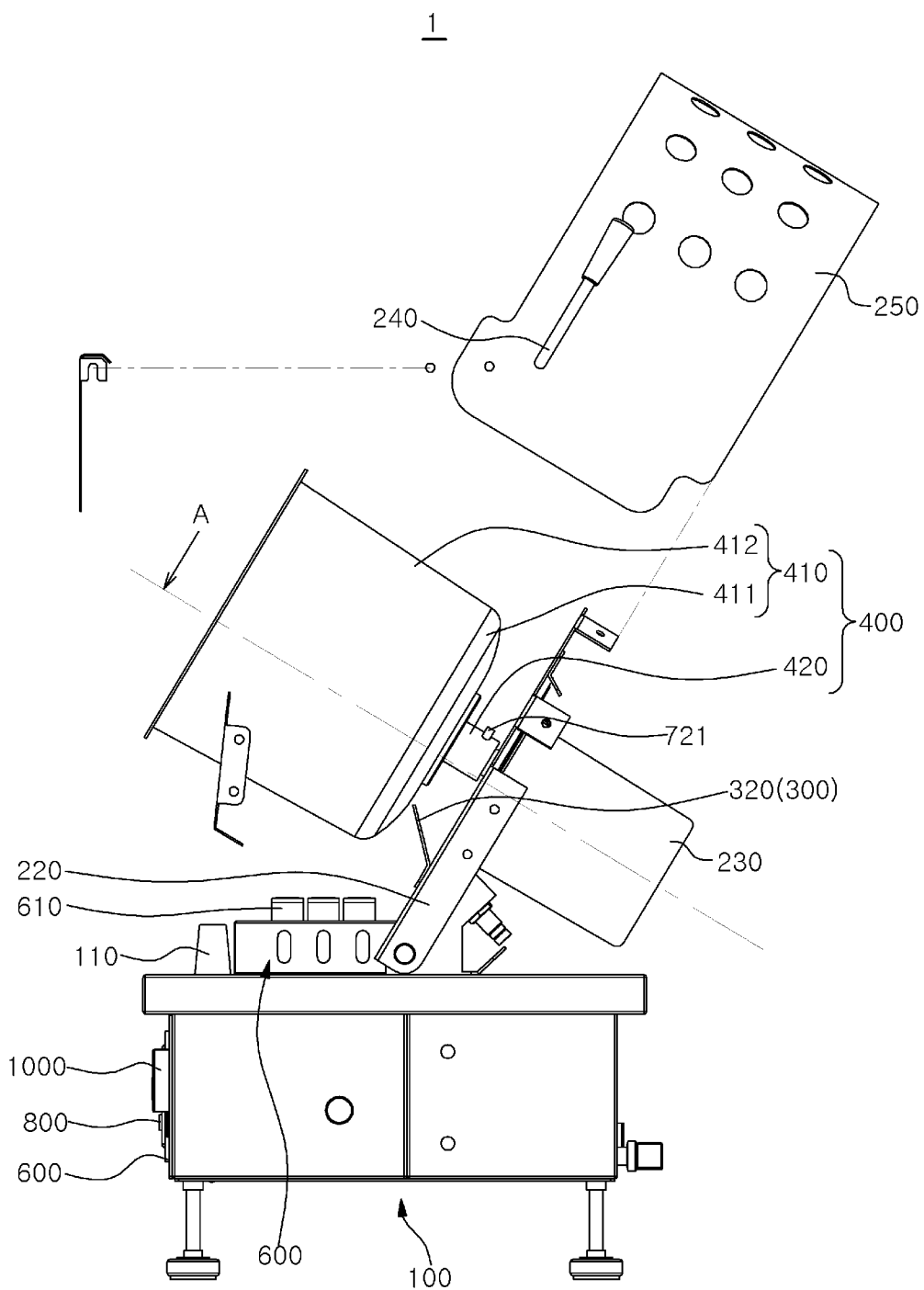
FIG. 4 is an exploded left side view of the cooking apparatus shown in FIG. 1.

Further, the heat insulating member 310 can be provided as a plate arranged substantially parallel with the bottom portion 411 of the cooking container 400 which will be described later. The heat insulating member 310 may be made of ceramic. Further, the heat insulating member 310 may be provided between the second supporting member 220 and the power generator 710 of the driving unit 700 which will be described later. As shown in FIG. 4, the heat insulating member 310 may have a side that is equal to or smaller than the size of the bottom portion 411 of the cooking container 400 when viewed in an axial direction A and greater than the size of the power generator 710 of the driving unit 700 when viewed in the axial direction A. Here, the axial direction A is defined as an extension direction of the driving shaft 720 of the driving unit 700. Therefore, when the driving shaft 720 is moved by movement and rotation of the supporting unit 200, the axial direction A is changed.

The heat shield 320 can prevent the heat of the heater 600 from being applied directly or radiated to the driving unit 700. The heat shield 320 may be supported on the front side of the second supporting member 220 at a position below the driving shaft 720. The lower portion of the heat shield 320 may be connected to the lower portion of the second supporting member 220. Further, the heat shield 320 can extend upward toward the cooking container 400. For example, the heat shield 320 may have a plate shape extending obliquely upward with respect to the second supporting member 220, and the upper end portion of the heat shield 320 becomes adjacent to the cooking container 400. Further, the heat shield 320 may have a size that is equal to or smaller than the size of the bottom portion 411 of the cooking container 400 when viewed in the axial direction A and greater than the size of the heater 600 when viewing the cooker 1 from the front side.

Figure 9:
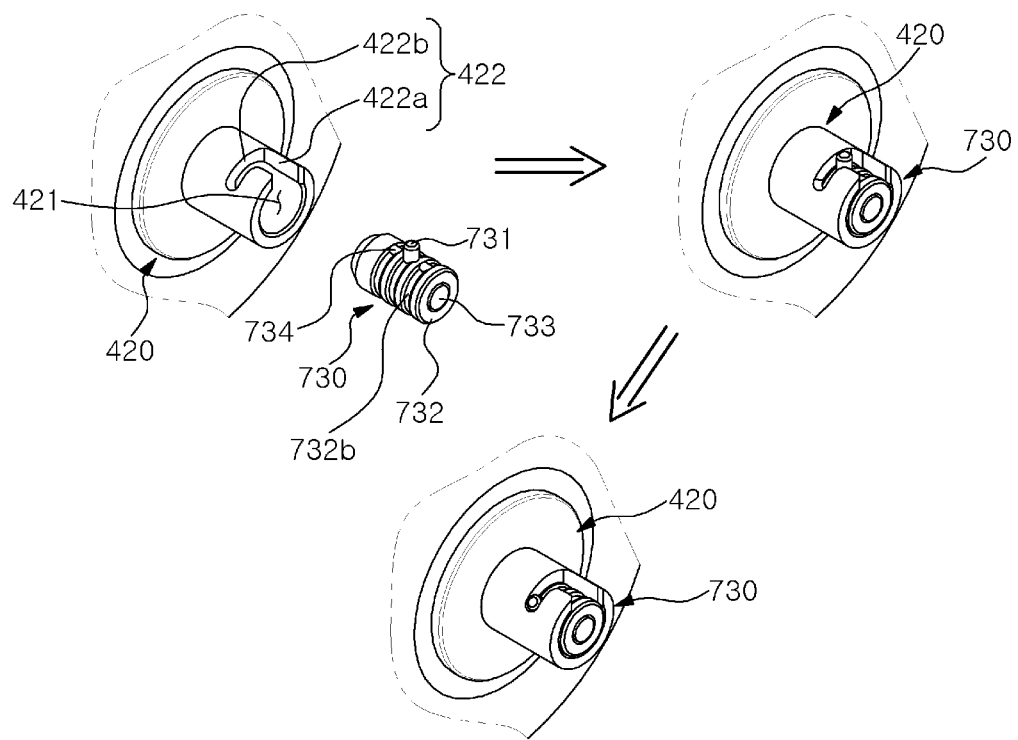
FIG. 9 shows a process in which the driving unit shown in FIG. 8 is attached to the cooking container.
Figure 10:
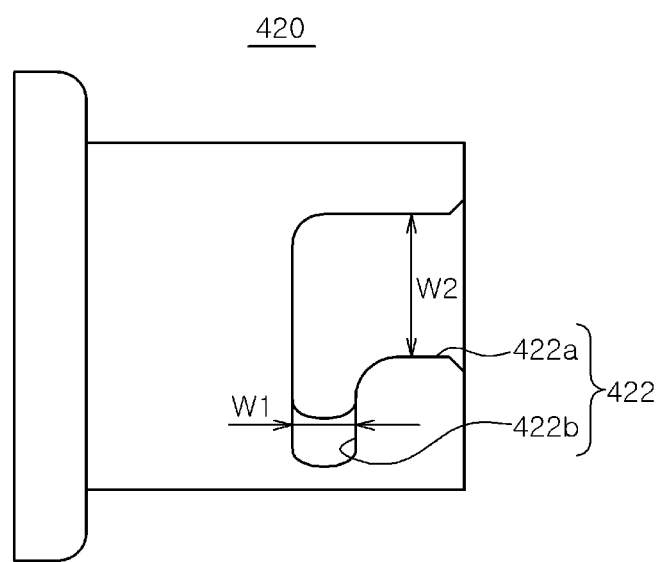
FIG. 10 is a side view of a connector shown in FIG. 8.
Figure 11:
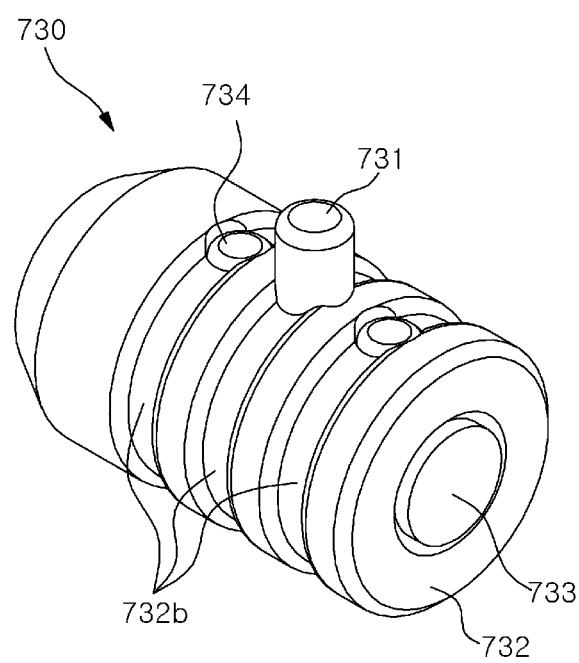
FIG. 11 is a perspective view of the connector shown in FIG. 8.
Figure 12:
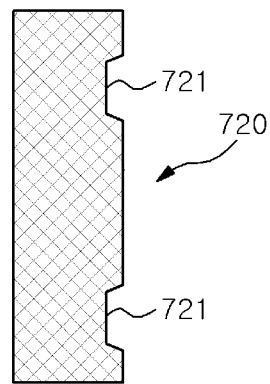
FIG. 12 is a vertical cross sectional view showing a state in which a connecting part shown in FIG. 8 is disassembled.
Figure 12:
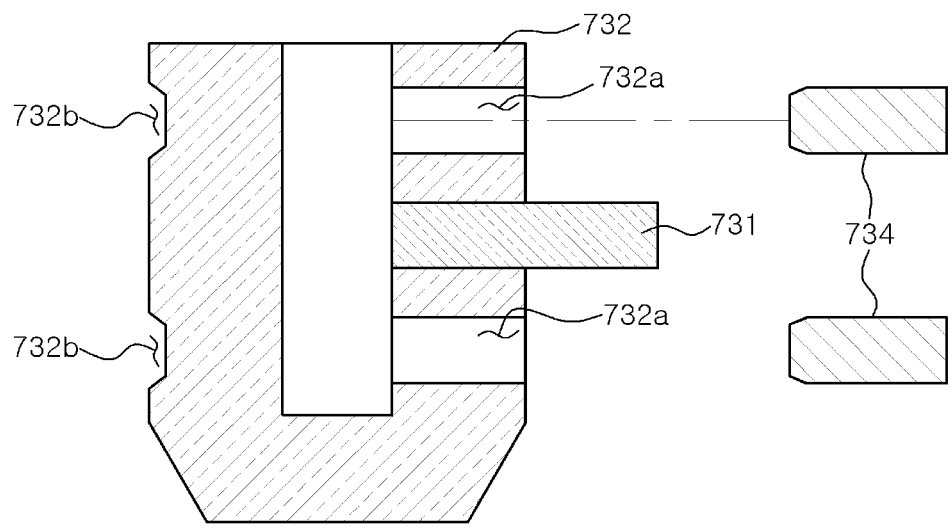

Hereinafter, the cooking container 400 will be described with reference to FIGS. 8 to 10. Referring to FIGS. 8 to 10, the cooking container 400 can contain cooked food. The cooking container 400 can be detachably installed at the supporting unit 200 with the opening directed frontward. The cooking container 200 may include a container main body 410 and a connector 420.

The container main body 410 has an opening and may include a bottom portion 411 and a circumferential portion 412. The center of the bottom portion 411 may protrude outward. In other words, the bottom portion 411 may have a convex shape when viewed from the side as shown in FIG. 4. The bottom portion 411 may have a circular shape when viewed in the axial direction A. The circumferential portion 412 may be a wall connected to the bottom portion 411 to extend from the bottom portion 411 along the axial direction A. The circumferential portion 412 may be a cylindrical wall. The diameter of the circumferential portion 412 may be smaller at it goes away from the opening. The bottom portion 411 and the circumferential portion 412 may form a space capable of containing food to be cooked.

The connector 420 can be selectively engaged with the connecting part 730 of the driving unit 700 which will be described later. The connector 420 may be connected to the bottom portion 411 of the container main body 410. A flange may be formed at the connector 420. As shown in FIG. 10, the connector 420 may be provided with an engaging portion 421 into which the connecting part 730 is inserted and an engaging hole 422 into which an engaging protrusion 731 of the connecting part 730 is inserted.

The engaging portion 421 has a groove shape recessed in the axial direction A from the end portion of the connector 420. The engaging hole 422 may be formed at the engaging portion 421. Further, the engaging hole 422 may be recessed from the end portion of the connector 420 and may penetrate through the hole-shaped engaging portion 421 to the outside of the connector 420.

The engaging hole 422 may include a guide portion 422a extending in the axial direction A and a latching portion 422b formed at one end portion of the engaging portion 421. When the connecting part 730 is engaged with the connector 420, the connecting part 730 is accommodated in the engaging portion 421, and the engaging protrusion 731 of the connecting part 730 is inserted into the latching portion 422b along the guide portion 422a of the engaging hole 422. A width w1 of the guide portion 422a may be greater than a width w2 of the latching portion 422b by 2 to 2.5 times. The user can easily perform the engagement of the connecting part 730 by the guide portion 422a having a large width. The latching portion 422b can extend in one of the clockwise direction or the counterclockwise direction with respect to the axial direction A. In this specification, the clockwise direction and the counterclockwise direction are defined about the center of the engaging portion 421 or the center of the driving shaft 720 when the connector 420 is viewed along the axial direction A from the opening side of the cooking container 400 (i.e., when viewed from the front side).

Figure 14:
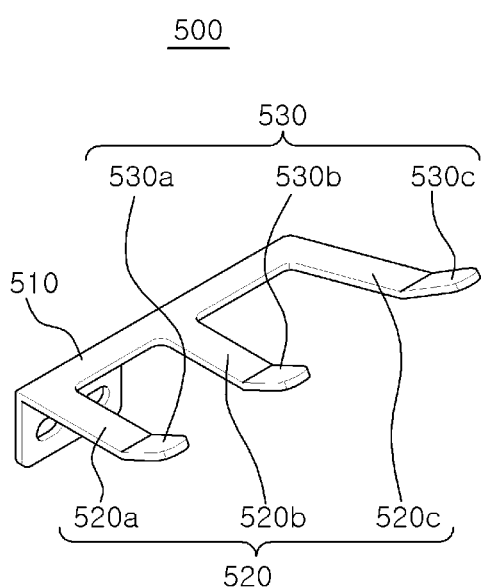
FIG. 14 is a perspective view of a stirring member provided at the cooking apparatus shown in FIG. 1.
Figure 15:
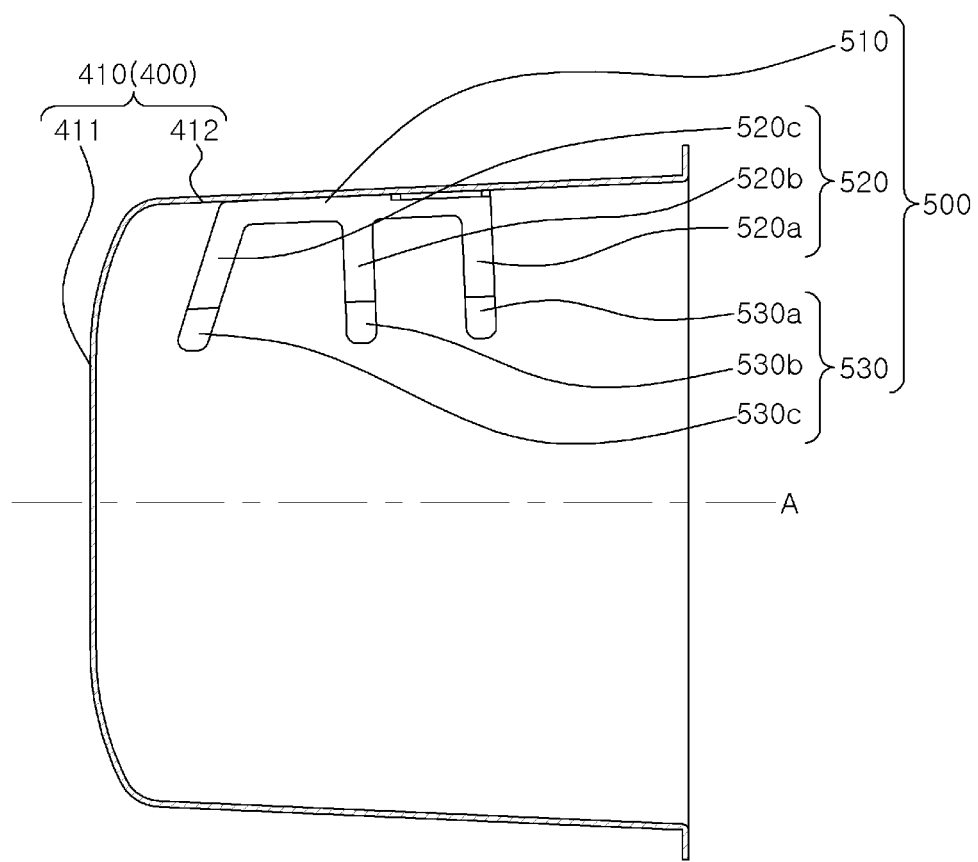
FIG. 15 is a cross sectional view of the cooking container shown in FIG. 3 which is taken along a line XV-XV in FIG. 3.

Hereinafter, the stirring member 500 will be described with reference to FIGS. 14 and 15. Referring to FIGS. 14 and 15, the stirring member 500 may be provided inside the cooking container 400 to cook food in the cooking container 400. The stirring member 500 may include a base portion 510, an extended portion 520, and a bent portion 530.

The base portion 510 may be connected to the cooking container 400. Further, the base portion 510 can support the extended portion 520. The stirring member 500 can be arranged such that the base portion 510 can extend in the axial direction A.

The extended portion 520 can extend from the base portion 510 or the sidewall of the container main body 410 toward the center of the container main body 410 so that the food contained in the cooking container 400 can be caught. The extended portion 520 may have a plate having a width in the axial direction A. The extended portion 520 may be arranged between the base portion 510 and the bent portion 530. A plurality of extended portions 520 may be provided, and at least a part of the extended portions 520 may be spaced apart from one another. Noodles such as spaghetti and the like in the cooking container 400 are caught between the extended parts 520 and thus can be stirred well. The projecting length of the extended portion 520 from the base portion 510 may be ⅕ to ⅓ the radius of the cooking container 400. The plurality of extended portions 520 may include a first extended portion 520a, a second extended portion 520b, and a third extended portion 520c which are arranged along the axial direction A.

The first extended portion 520a may extend in a direction substantially perpendicular to the axial direction A and may be disposed closer to the opening of the cooking container 400, compared to the second extended portion 520b and the third extended portion 520c. When viewed from the side, the first extended portion 520a is closer to the second extended portion 520b than to the opening of the cooking container 400. In other words, when viewed from the side, the distance in the axial direction A between the first extended portion 520a and the second extended portion 520b may be smaller than the distance in the axial direction A between the first extended portion 520a A and the opening of the cooking container 400.

The second extended portion 520b may extend in substantially the same direction as the extension direction of the first extended portion 520a and may be be disposed between the first extended portion 520a and the second extended portion 520b.

The third extended portion 520c may extend further away from the opening of the container main body 410 as it goes away from the base portion 510 or the sidewall of the container main body 410. In other words, the third extended portion 520c may extend to be inclined toward the bottom portion 411 of the cooking container 400. The inclination of the third extended portion 520c may be substantially the same as the inclination of the bottom portion 411. The third extended portion 520c may be spaced apart from the bottom portion 411 by a predetermined distance. The distance between the third extended portion 520c and the bottom portion 411 may be substantially equal to the distance between the first extended portion 520a and the second extended portion 520b. The distance between the third extended portion 520c and the second extended portion 520b may be greater than the distance between the first extended portion 520a and the second extended portion 520b.

The bent portion 530 may extend while being bent with respect to the extended portion 520. In other words, the bent portion 530 may extend from the extended portion 520 in a direction different from the extension direction of the extended portion 520. Further, the bent portion 530 may be bent along the rotation direction of the driving shaft 720. For example, when viewed from the front side, when the driving shaft 720 rotates in the clockwise direction with respect to the axial direction A (indicated by an arrow in FIG. 1), the bent portion 530 may also rotate in the clockwise direction with respect to the axial direction A.

The bent portion can extend towards a point deviated from the center of the cooking container 400. The bent portion 530 may be formed in a plate shape having a width in the axial direction A. Further, the bent portion may be provided at the end portion of the extended portion 520. Since there are provided a plurality of extended portions 520, a plurality of bent portions may be provided. Noodles such as spaghetti and the like are effectively caught by the bent portions and thus can be stirred well in the cooking container 400. The extension length of the bent portion from the extended portion 520 may be ⅓ to ⅔ of the extension length of the extended portion 520.

The plurality of bent portion 530 may include a first bent portion 530a connected to the first extended portion 520a, a second bent portion 530b connected to the second extended portion 520b, and a third bent portion 530c connected to the third extended portion 520c. All or some of the inclination angle of the first bent portion 530a with respect to the first extended portion 520a, the inclination angle of the second bent portion 530b with respect to the second extended portion 520b, and the inclination angle of the third bent portion 530c with respect to the third extended portion 520c may be substantially the same.

When viewed from the side or in the axial direction A, all or some of the first bent portion 530a, the second bent portion 530b, and the third bent portion 530c may have the same length. In other words, when the first bent portion 530a, the second bent portion 530b and the third bent portion 530c are projected in the axial direction A, all or some of the first bent portion 530a, the second bent portion 530b, and the third bent portion 530c may have the same length. The third bent portion 530c may extend further away from the opening of the cooking container 400 as it goes away from the third extended portion 520c. In other words, the third bent portion 530c may extend to be inclined toward the bottom portion of the cooking container 400.

The heater 600 can generate heat for cooking food in the cooking container 400. The heater 600 may include a plurality of gas nozzles 610, an ignition part adjacent thereto, a gas supply line, and an operation button. The gas from the gas nozzles 610 is combusted by spark generated at the ignition part, and heat is generated. The gas nozzles 610 may be arranged in a plurality of rows and a plurality of columns in the frontward/backward direction. For example, the gas nozzles 610 may be arranged in three rows and three columns.

Hereinafter, the driving unit 700 will be described with reference to FIGS. 8, 9, 11, and 12. The driving unit 700 can rotate the cooking container 400. The driving unit 700 can be supported by the second supporting member 220. Further, the driving unit 700 may be disposed on the rear side of the second supporting member 220.

The driving unit 700 include a power generator 710 for generating power for rotating the cooking container 400, a driving shaft 720 connected to the power generator 710 and rotated by the power generator 710, and a connecting part 730 provided between the driving shaft 720 and the connector 420. The front end portion of the power generator 710 is disposed on the rear side of the second supporting member 220 and can be connected to the heat insulating member 310. The power generator 710 may include a motor 711 and a transmission 712. The motor 711 is configured not to be manually rotated when no power is applied thereto. The motor 711 may be, e.g., a reversible motor. The transmission 712 can be a speed reducer for decelerating the rotation speed of the motor 711 at a ratio of 55:1 to 65:1 and increasing the torque. The motor 711 and the transmission 712 can be covered by the driving unit cover 230.

The driving shaft 720 is a rotation shaft that can be rotated by the power generator 710. The driving shaft 720 extends from the power generator 710 to the cooking container 400. A fastening groove 721 recessed in a direction deviated from the axial direction A may be formed on the outer peripheral surface of the driving shaft 720. An insert 734 of the connecting part 730 may be inserted into the fastening groove 721. By inserting the insert 734 into the fastening groove 721, the connecting part 730 and the driving shaft 720 can be firmly connected to each other. The fastening groove 721 may have a concave shape.

The connecting part 730 may be provided between the driving shaft 720 and the connector 420. The driving shaft 720 can be inserted into the connecting part 730. In other words, the connecting part 730 may surround the driving shaft 720.

The connecting part 730 may include an engaging protrusion 731, a connecting body 732, and an insert 734.

The engaging protrusion 731 may extend in a direction substantially perpendicular to the axial direction A. One end portion of the engaging protrusion 731 is connected to the connecting body 732, and the other end portion of the engaging protrusion 731 can be engaged with the connector 420. The other end portion of the engaging protrusion 731 may be inserted through the guide portion 422a of the engaging hole 422 provided in the connector 420 and engaged with the latching portion 422b.

The connecting body 732 may have a shape corresponding to the engaging portion 421 to be inserted into the engaging portion 421 of the connector 420. The connecting body 732 may be a rigid body surrounding the driving shaft 720. The connecting body 732 may be provided with a body insert hole 732a into which the insert 734 is inserted. The body insert hole 732a extends in a direction deviated from the axial direction A. For example, the body insert hole 732a may be a through-hole penetrating through the connecting body 732 in a direction substantially perpendicular to the axial direction A. The body insert hole 732a may be formed at both sides in the axial direction A of the engaging protrusion 731. A plurality of body insert holes 732a may be provided. The plurality of body insert holes 732a may be arranged side by side along the axial direction A.

One or more recesses 732b extending along the circumferential direction of the outer peripheral surface of the connecting body 732 may be formed. The recesses 732b may be formed in a groove shape recessed toward the center of rotation of the connecting part 730. A round may be formed between the region supporting the connector 420 and the region forming the recesses 732b on the outer peripheral surface of the connecting body 732. The round may have a smooth curved shape when viewed from the side cross section. The contact area between the connecting body 732 and the connector 420 can be reduced due to the recesses 732b formed on the outer peripheral surface of the connecting body 732, and the transfer of the heat of the connector 420 to the connecting body 732 can be suppressed. The recesses 732b may be spaced apart from each other along the longitudinal direction of the connecting body 732. The body insert holes 732a may be disposed at the recesses 732b. When the connecting part 730 is viewed in the vertical cross section, the width of the recesses 732b may be equal to or smaller than the width of the body insert holes 732a.

The insert 734 can be inserted into the body insert hole 732a to fix the connecting part 730 to the driving shaft 720. The insert 734 can penetrate through the body insert hole 732a to be inserted into the fastening groove 721 of the driving shaft 720. A plurality of inserts 734 may be provided, and the plurality of inserts 734 may be arranged side by side along the axial direction A. An engaging protrusion 731 may be disposed between the plurality of inserts 734. The insert 734 may have a pin shape. When the connecting part 730 is viewed in the vertical cross section, the insert 734 may have the same width as that of the body insert hole 732a. The insert 734 may have a size that allows the insert 734 inserted into the body insert hole 732a to protrude beyond the bottom surface of the recess 732b to be positioned closer to the center of rotation than to the outer peripheral surface of the connecting body 732.

Figure 13:
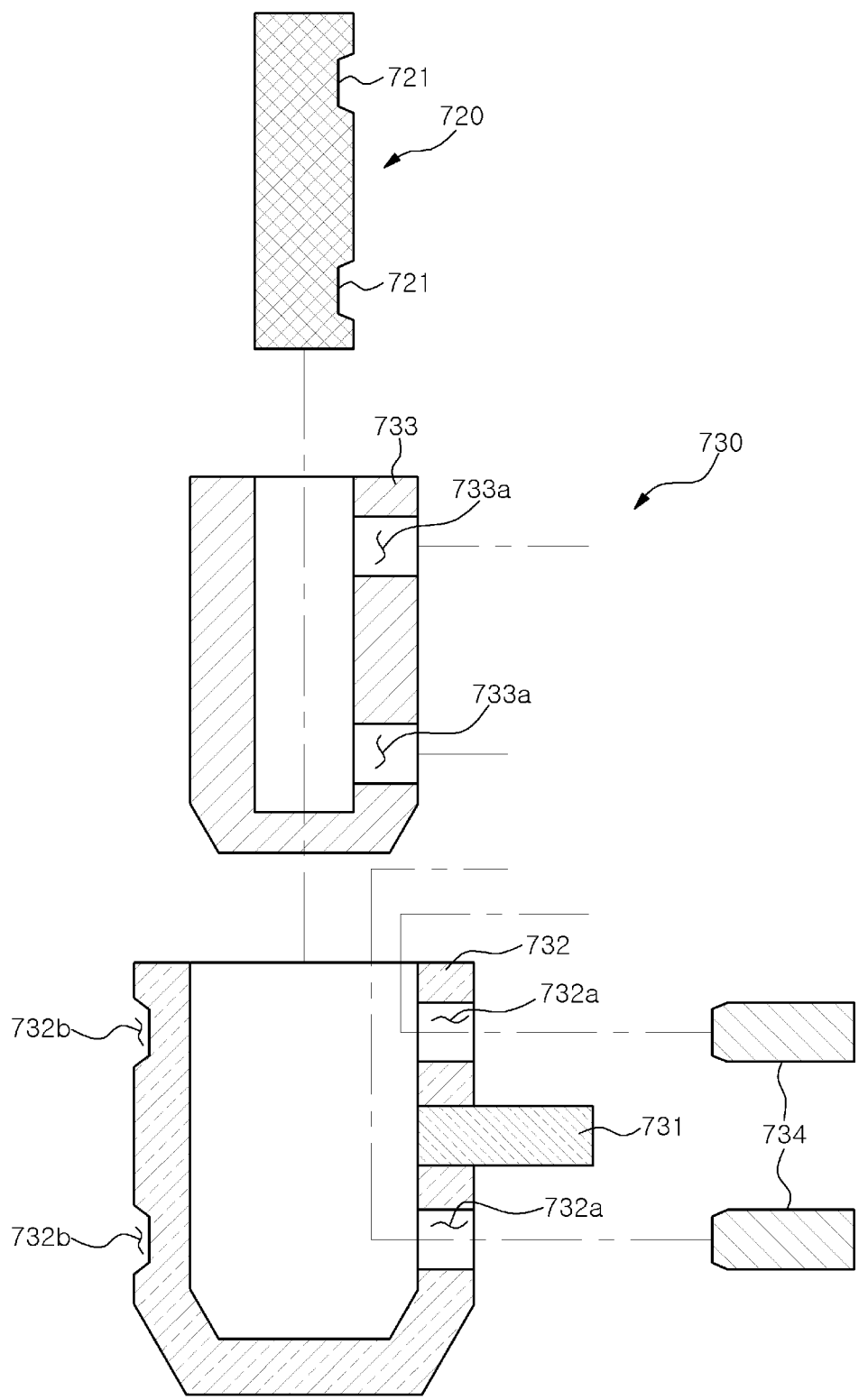
FIG. 13 is a vertical cross sectional view showing a state in which another connecting part is disassembled.

Referring to FIG. 13, the connecting part 730 may be modified to further include a shaft heat insulator 733. In that case, the driving shaft 720 may be covered by the connecting part 730 without direct contact with the connecting body 732. In other words, the shaft heat insulator 733 may be provided in the connecting body 73 and interposed between the driving shaft 720 and the connecting body 732. The shaft heat insulator 733 can block the heat conduction between the connector 420 and the driving shaft 720. The shaft heat insulator 733 may extend in the axial direction A, and is accommodated in the connecting body 732. Further, the shaft heat insulator 733 may have therein a space where the driving shaft 720 can be inserted. The shaft heat insulator 733 may be made of, e.g., Teflon (trademark). A heat insulator insert hole 733a into which the insert 734 can be inserted may be formed at the shaft heat insulator 733. The heat insulator insert hole 733a may extend in a direction deviated from the axial direction A. For example, the heat insulator insert hole 733a may be a through-hole penetrating through the shaft heat insulator 733 in a direction substantially perpendicular to the axial direction A. The heat insulator insert hole 733a may be formed at a position corresponding to the body insert hole 732a. In that case, the insert 734 may be inserted into the fastening groove 721 of the driving shaft 720 while penetrating through the body insert hole 732a and the insulator insert hole 733a.

The rotation direction of the driving unit 700 may be the same as the extension direction of the engaging portion 422b of the connector 420. For example, as shown in FIGS. 8 and 9, when the latching portion 422b extends only in the clockwise direction with respect to the axial direction A, the driving unit 700 moves the driving shaft 720 to rotate only in the clockwise direction. The driving unit 700 may be configured to be driven and stopped by a separately provided operation button. However, the driving unit 700 may be configured to be driven and stopped by the operation button of the heater 600.

The control unit 800 can control the operations of the driving unit 700, the notification device 900, and the timer 1000. The control unit 800 may include an input device, a memory, a processor, and an output device. A user can input first time and second time by using the input device and the control unit 800 receives a signal of the operating state of the heater 600. The memory can store the first time and the second time. The processor can recognize the elapse of time and perform a control calculation process. The output device can generate an output signal based on the result processed by those processors.

The control unit 800 receives the first time and the second time inputted through the input device by the user, and stores the first time and the second time in the memory. The control unit 800 senses the operation start of the heater 600 through a sensor that may be provided at the heater 600, a signal input of the operation button of the heater 600, or the like.

Further, when the operation of the heater 600 is started, the control unit 800 starts to count time. The control unit 800 controls the notification device 900 to generate a notification signal when the time reaches the first time after the start of the heater and to stop the notification signal when the time reaches the second time after the first time. When the time reaches the second time, the timer 1000 controls the timer 1000 to start to count time. The user can recognize the elapsed time from the second time by the timer 1000.

The notification device 900 may generate a notification signal that may be recognized by the user during the second time. The operation of the notification device 900 is controlled by the control unit 800. The notification device 900 may be a speaker capable of generating sound, a light emitting device such as an LED or the like. The notification signal may be sound, light, or the like.

The timer 1000 is configured to count time. The timer 1000 includes a time display device for displaying counted time. The user can recognize the operation time of the timer 1000 by the time display device of the timer 1000.

Hereinafter, the operation of the cooking apparatus 1 configured as described above will be described.

When the user starts cooking, the cooking container 400 may be in an inclined state. In other words, in an initial state, the supporting unit 200 is not engaged with the latch 101, and the upper portion of the second supporting member 220 may be rotated to the rear side. In a state where the upper portion of the second supporting member 220 is rotated to the rear side, the second supporting member 220 is maintained in a stable state due to the load of the cooking container 400.

The user operates the driving unit 700, and the cooking container 400 is rotated by the operation of the driving unit 700. Further, the user inputs the first time and the second time into the input device of the control unit 800 and operates the heater 600. When the heater 600 starts to operate, the control unit 800 starts to count time. The control unit 800 controls the notification device 900 to generate a notification signal when the time reaches the first time and stops the notification signal of the notification device 900 when the time reaches the second time after the first time. The user who has recognized the notification signal by the notification device 900 can recognized that the cooking container 400 has been preheated and can put food into the cooking container 400.

When the time reaches the second time, the control unit 800 activates the timer 1000. Even after the timer 1000 is activated, the heater 600 maintains the operation state. The user can recognize the cooking time by the timer 1000 and can cook for a period of time suitable for the food. In other words, the user can recognize that the cooking has finished based on the time displayed on the timer 1000. The user can move the first supporting member 210 to the rear side of the main body 100 to prevent the driving unit 700 from being excessively heated during the cooking.

When the cooking is finished, the user inclines the cooking container 400 to be substantially horizontal with the ground by using the handle 240 and engages the locking part 270 with the latch 101. Since the circumferential portion 412 of the container main body 410 has a diameter that becomes greater toward the opening side, the food in the cooking container 400 can be easily taken out along the circumferential portion 412 of the container body 410.

The embodiments as set forth above are merely described as examples of technical idea of the present disclosure. Technical idea of the present disclosure is not limited to the embodiments as set forth above, and it will be understood by those skilled in the art to which the present disclosure belongs that various changes, modifications and substitutions may be made without departing from technical idea of the present disclosure, and all of such implementations should be within the scope of the technical idea of the present disclosure.

What is claimed is:

1. A cooking apparatus comprising:
a cooking container configured to store food;
a heater configured to heat the cooking container;
a driving unit including a power generator configured to generate power for rotating the cooking container and a driving shaft extending in one direction and rotated by the power generator;
a heat insulating member provided between the cooking container and the power generator and configured to prevent heat generated by the heater from being transferred to the power generator;
a main body; and
a supporting unit supported by the main body,
wherein the supporting unit includes:
a first supporting member supported by the main body to be reciprocable in a direction in which the cooking container becomes away from and closer to the heater; and
a second supporting member supported rotatably with respect to the first supporting member and configured to support the driving unit.

2. The cooking apparatus of claim 1, further comprising:
a stirring member configured to stir noodles in the cooking container,
wherein the stirring member includes:
a base portion;
a plurality of extended portions spaced apart from each other and extending from the base portion toward the center of the cooking container to catch noodles in the cooking container; and
a plurality of bent portions extending from the respective extended portions while being bent with respect to the extended portions.

3. The cooking apparatus of claim 2, wherein the plurality of extended portions includes:
a first extended portion;
a second extended portion; and
a third extended portion extending further away from an opening of the cooking container as it goes away from the base portion,
wherein the second extended portion is provided between the first extended portion and the third extended portion, and
the first extended portion is closer to the second extended portion than to the opening of the cooking container.

4. The cooking apparatus of claim 1, wherein the center of rotation of the second supporting member with respect to the first supporting member is located at a lower rear end of the second supporting member.

5. The cooking apparatus of claim 1, wherein the driving unit further includes:
a connecting part connected to the driving shaft,
wherein the connecting part includes:
a connecting body; and
an engaging protrusion extending from an outer surface of the connecting body in a direction deviated from said one direction,
wherein one or more recesses are formed on an outer peripheral surface of the the connecting body, the one or more recesses extending along a circumferential direction of the outer peripheral surface.

6. The cooking apparatus of claim 5, wherein the connecting part further includes an insert to be fixed to the driving shaft,
a body insert hole, for allowing the insert to be inserted therethrough to the driving shaft, is formed at the connecting body, and
the body insert hole is formed at the recess.

7. The cooking apparatus of claim 5, wherein the connecting part further includes:
a shaft heat insulator inserted into the connecting body and surrounding the driving shaft to prevent heat from being transferred to the driving shaft.

8. The cooking apparatus of claim 5, wherein the cooking container includes:
a container main body providing a space for storing food; and
a connector that is coupled to the container main body and selectively engaged with the connecting part and that provides an engaging hole into which the engaging protrusion is inserted,
wherein the engaging hole includes:
a guide portion extending in said one direction; and
a latching portion extending from one end portion of the guide portion in one of a clockwise direction and a counterclockwise direction with respect to an axial direction of the driving shaft.

9. The cooking apparatus of claim 8, wherein a width of the guide portion is greater than a width of the latching portion by 2 to 2.5 times.

10. The cooking apparatus of claim 9, wherein the power generator is configured to rotate the cooking container only in said one of the clockwise direction and the counterclockwise direction about the driving shaft and prevent the driving shaft from rotating in the other one of the clockwise direction and the counterclockwise direction when there is no power.

11. The cooking apparatus of claim 1, further comprising:
a heat shield supported by the second supporting member and configured to prevent heat generated by the heater from being transmitted to the power generator,
wherein the heat shield extends upward toward the cooking container at a position below the driving shaft.

12. The cooking apparatus of claim 1, wherein the supporting unit further includes a driving unit cover surrounding the driving unit and provided with a heat radiation hole.

13. The cooking apparatus of claim 1, further comprising:
a notification device configured to generate a signal to be recognized by a user;
a timer configured to count and display a predetermined period of time; and
a control unit configured to receive a signal of an operation of the heater, control operations of the notification device and the timer, and receive inputs of a first time and a second time,
wherein the control unit is configured to control the notification device to generate a notification signal when time reaches the first time after the heater is operated and to stop the notification signal when time reaches the second time and also configured to control the timer to start to count time when time reaches the second time.

14. The cooking apparatus of claim 1, wherein the heat insulating member includes a plate made of ceramic.

* * * * *